United States Patent
Kharod et al.

(10) Patent No.: US 6,837,529 B2
(45) Date of Patent: Jan. 4, 2005

(54) MIDGATE ASSEMBLY INCLUDING FIXED WINDOW AND CROSSBAR

(75) Inventors: Ajay Mahesh Kharod, Rochester Hills, MI (US); Carlos N. Czirmer, Rochester, MI (US); Andrew J. Novajovsky, Grand Blanc, MI (US); John J. Mascarello, Livonia, MI (US); Richard J. Lange, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/443,310

(22) Filed: May 22, 2003

(65) Prior Publication Data

US 2004/0232722 A1 Nov. 25, 2004

(51) Int. Cl.⁷ .............................................. B62D 33/06
(52) U.S. Cl. .............. 296/24.4; 296/26.11; 296/190.11; 296/183.1; 296/146.4
(58) Field of Search .......................... 296/146.1–146.2, 296/146.4, 146.9, 147, 190.08, 190.1, 190.11, 183, 37.16, 26.11, 24.4, 183.1

(56) References Cited

U.S. PATENT DOCUMENTS

| | | | |
|---|---|---|---|
| 5,934,727 A | 8/1999 | Storc et al. | 296/26.11 |
| 6,217,097 B1 * | 4/2001 | Rogers et al. | 296/57.1 |
| 6,260,916 B1 | 7/2001 | Hunt | 296/190.11 |
| 6,357,813 B1 * | 3/2002 | Vandeberghe et al. | 296/57.1 |
| 6,416,104 B1 | 7/2002 | Fisher et al. | 296/37.16 |
| 6,478,355 B1 | 11/2002 | Van Eden et al. | 296/37.6 |
| 6,481,772 B1 * | 11/2002 | Tenn | 296/26.11 |
| 6,513,863 B1 | 2/2003 | Renke et al. | 296/190.11 |

* cited by examiner

Primary Examiner—Dennis H. Pedder
(74) Attorney, Agent, or Firm—Laura C. Hargitt (57) ABSTRACT

A vehicle body includes a first compartment for carrying passengers or cargo and a second compartment for carrying cargo rearwardly adjacent the first compartment. The body includes a frame defining an opening between the first and second compartments. A window is fixed in an upper portion of the opening and a crossbar is fixed in the opening below the window. A midgate panel is pivotally connected in a lower portion of the opening for movement between a closed position covering the lower portion of the opening and an open position permitting access through the lower portion of the opening. A drive motor is operatively connected with the midgate panel for pivoting the midgate panel between the open and closed positions. A counterbalancing strut is operatively connected between the midgate panel and a body floor to bias the midgate panel toward the open and closed positions, alternatively, depending upon the pivoted position of the midgate panel.

19 Claims, 10 Drawing Sheets

MIDGATE ASSEMBLY INCLUDING FIXED WINDOW AND CROSSBAR

TECHNICAL FIELD

The present invention relates to a midgate assembly including a fixed window and crossbar which are installed in a body opening between a passenger compartment and a cargo compartment of the vehicle.

BACKGROUND OF THE INVENTION

It is known in the art to provide a pickup truck having a cab portion for carrying passengers with a rear seat section behind the driver and a cargo box behind the cab portion for carrying cargo. It is also known to provide aligned openings in the cab portion and the cargo box for carrying longer loads which extend into the passenger compartment when the rear seat is folded down. Currently, a multi-use vehicle is available which provides a pickup truck having a rear passenger compartment convertible to a cargo area and separated from a rear pickup box by a midgate having a flexible hinged panel and window system. This vehicle is adapted to accommodate a variety of optional configurations for alternatively carrying a maximum passenger load or an extended cargo load under both covered and uncovered conditions in which the cargo load is protected from or exposed to ambient external conditions.

SUMMARY OF THE INVENTION

The invention provides a vehicle body having a first compartment for carrying passengers or cargo and a second compartment for carrying cargo rearwardly adjacent the first compartment. The body includes a frame defining an opening between the first and second compartments, a window fixed in an upper portion of the opening, and a crossbar fixed in the opening below the window. A midgate panel is pivotally connected in a lower portion of the opening for movement between a closed position covering the lower portion of the opening and an open position permitting access through the lower portion of the opening. A drive motor may be operatively connected with the midgate panel for pivoting the midgate panel between the open and closed positions.

According to another aspect of the invention, the body includes the frame, fixed window, fixed crossbar, and midgate panel as these components are described above, and also a counterbalancing strut operatively connected between the midgate panel and a body floor to bias the midgate panel toward open and closed positions, alternatively, depending upon the pivoted position of the midgate panel.

The fixed window may include a sliding glass mini-window to facilitate access through the window.

A pass-through aperture may also be formed in the midgate panel, and a ramp member may be pivotable between a closed position covering the pass-through aperture and an open position contacting a body floor and forming a ramp to facilitate sliding long cargo through the pass-through aperture. The ramp member preferably has a hinge end pivotably connected to the midgate panel and an opposite end which contacts the floor in the open position. A second ramp member may be connected to an opposite side of the midgate for selectively covering an opposite end of the pass-through aperture.

Alternatively, a slideable pass-through closure may be slideably positioned over a pass-through opening formed in the midgate panel.

A control may be provided for allowing unlatching of a midgate panel latch only when a corresponding vehicle transmission is in a park or neutral condition so that the midgate panel can be pivoted only when the vehicle is not moving.

These and other features and advantages of the invention will be more fully understood from the following description of specific embodiments of the invention taken together with the accompanying drawings.

BRIEF DESCRIPTION OF THE DRAWINGS

FIG. 13b shows an enlarged schematic view illustrating drive and driven gears and a motor of FIG. 13a;

DESCRIPTION OF THE PREFERRED EMBODIMENTS

Figure 1:
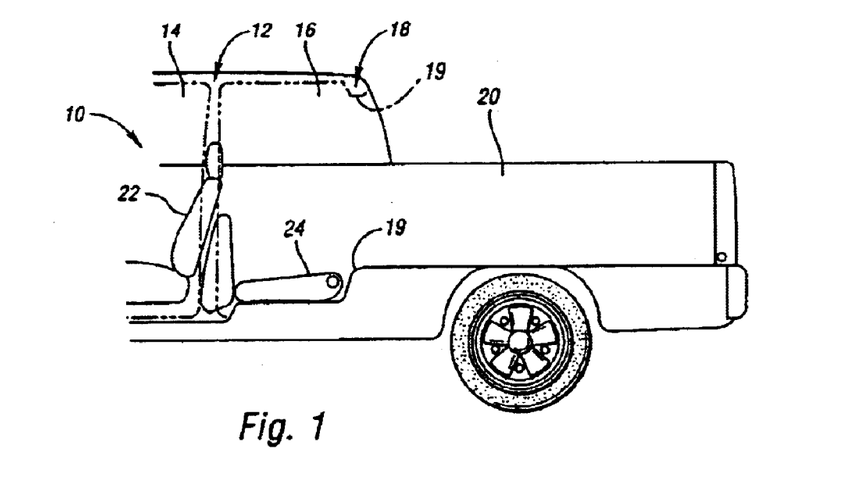
FIG. 1 shows a schematic partial side view of a vehicle having an opening for receiving a midgate in accordance with invention.

Referring to FIG. 1, numeral 10 generally indicates a pickup truck of the extended cab type having a body 12 including an internal front compartment 14 connected with an internal rear compartment 16 which is to be separated from an external rear compartment or cargo box 20 by a midgate assembly to be described below. The midgate assembly is positioned within the opening 19 between the compartment 16 and cargo box 20. As shown, seats 22, 24 are positioned in the front and rear compartments 14, 16, respectively. The seat 24 is collapsible as shown.

Figure 2:
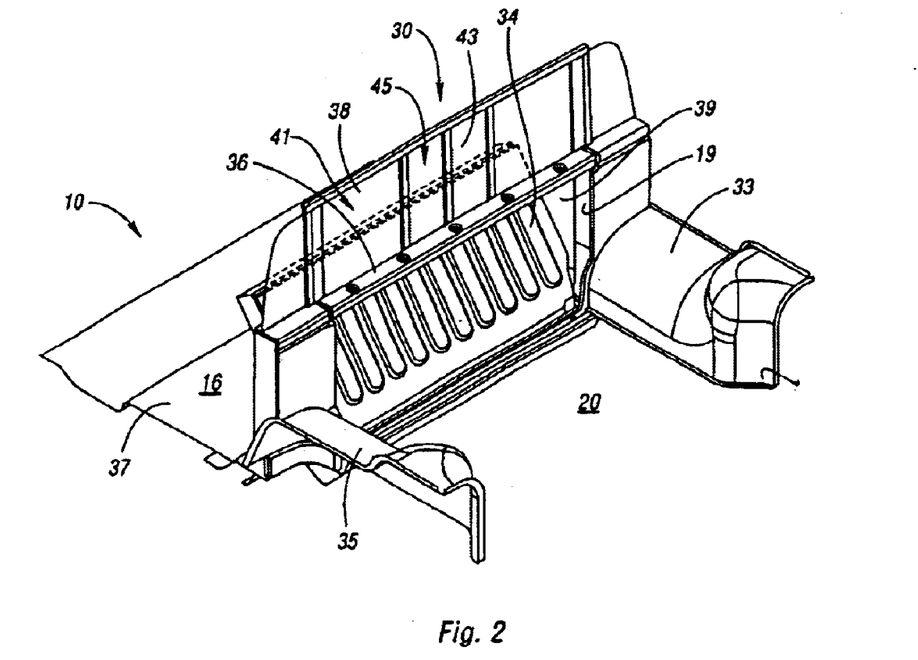
FIG. 2 shows a perspective view of a midgate panel assembly in accordance with the invention, including a fixed window, a slideable mini-window and a pivoting midgate panel.

Turning to FIG. 2, a midgate assembly 30 is shown for use in the opening 19 in the truck 10 of FIG. 1. FIG. 2 also illustrates the sidewalls 33, 35 of the cargo box 20, and the floor 37 of the internal compartment 16. The midgate panel 34 is pivotally connected in the lower portion 39 of the opening 19. The midgate panel may be steel, aluminum, magnesium or composite. The panel could be a single component, bent together with endcaps to hold it in a desired shape, or it could have a structural inner member with composite inner and outer panels. The panels could include glass or talc filler for strength. The panel could have separate metal inner and outer components. A fixed crossbar 36 extends across the opening 19, and the window 38 occupies the upper portion 41 of the opening 19.

The window 38 includes a slideable mini-glass portion 43 which is slideable with respect to the window 38 for selectively opening and closing a pass through aperture 45.

The midgate panel 34 also includes a latch which is engageable with a striker for selectively securing the midgate panel 34 in an upright, closed position.

Figure 3:
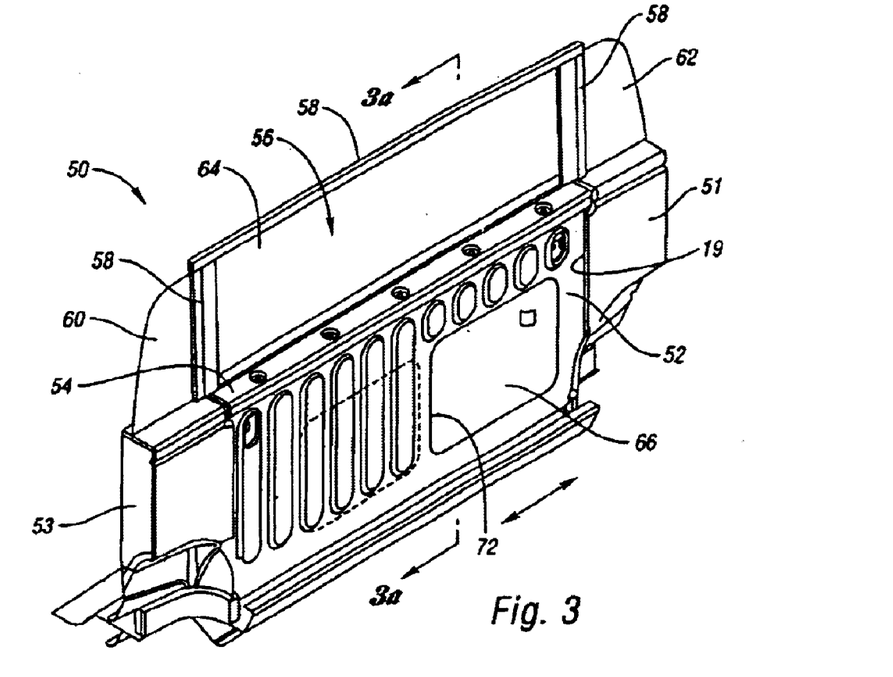
FIG. 3 shows a perspective view of an alternative midgate assembly.
Figure 3A:
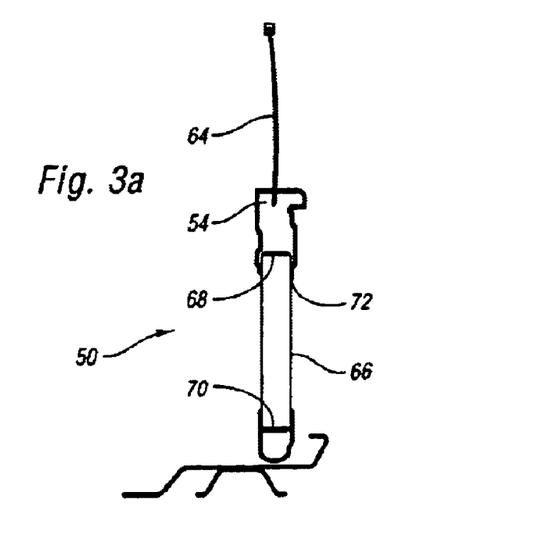
FIG. 3a shows a cross-sectional view taken at line 3a—3a of FIG. 3.

FIGS. 3 and 3a illustrate an alternative midgate assembly 50 for use in the midgate opening 19 of the vehicle 10 of FIG. 1. As shown, the midgate assembly 50 includes a midgate panel 52 which is pivotally connected within the opening 19 with respect to the sidewalls 51, 53. A fixed crossbar 54 extends across the opening 19 and supports the fixed window 56. The fixed window 56 includes a frame structure 58 and left and right window portions 60, 62, in addition to the middle portion 64.

The midgate panel 52 includes a slideable closure panel 66 which is slideably supported on upper and lower tracks 68, 70 for sliding movement between the closed position shown in FIG. 3, and the open position shown in phantom in FIG. 3 to permit access through the pass through aperture 72.

Figure 4:
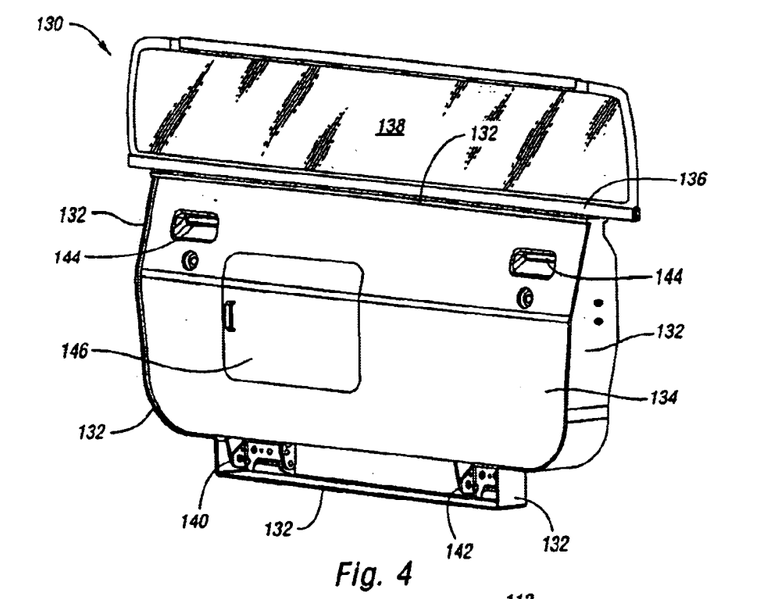
FIG. 4 shows a perspective view of a midgate assembly in accordance with a second alternative embodiment of the invention.

Turning to FIG. 4, a midgate assembly 130 is shown in accordance with a second alternative embodiment of the invention. The midgate assembly 130 includes a structural ring 132 which supports the pre-hung midgate panel 134. The midgate panel 134 is pivotably connected to the ring 132 by the hinges 140, 142, so that the midgate panel 134 is pivotable between a closed position as shown in FIG. 4, and an open position in which the midgate panel 134 is pivoted with respect to the ring 132 above the hinges 140, 142 to form a midgate opening.

Handles 144 are also provided, and internal striker/latches (not shown) selectively disconnect the midgate panel 134 from the ring 132 to allow pivoting movement of the midgate panel 134 with respect to the ring 132. A pass-through closure panel 146 is also shown for selectively covering a pass-through opening in the midgate panel 134.

Accordingly, the midgate panel 134 is "pre-hung" to the ring 132 prior to installation of the ring 132 in a vehicle body so that the midgate panel 134 may be accurately fit within the ring 132, and opening/closing effort of the midgate panel 134 with respect to the ring 132 may be optimized. In this manner, build variations of the vehicle body do not affect the installation of the midgate panel 134 or the opening/closing efforts of the midgate panel 134. In other words, the midgate panel is "perfectly adjusted" within the ring prior to installation in the vehicle to optimize fit, effort, function and sealing.

The midgate assembly 130 also includes a fixed cross-bar 136 which supports the fixed window 138.

Figure 5:
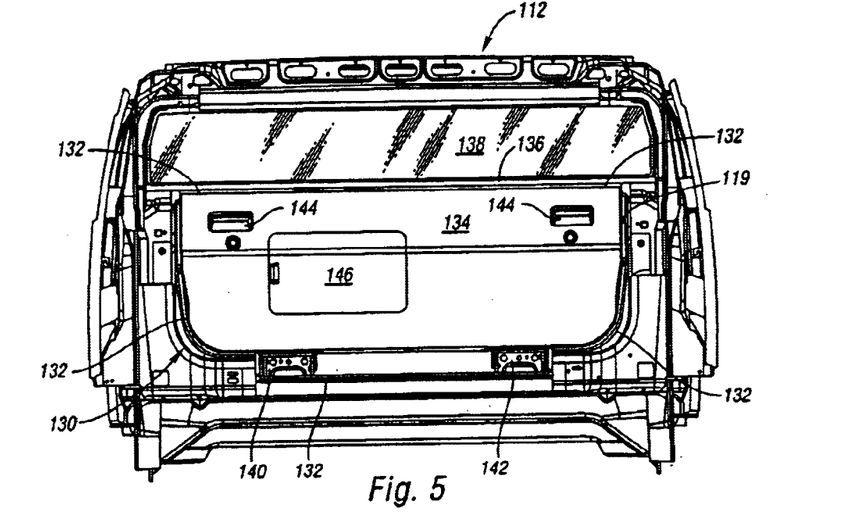
FIG. 5 shows a rear view of the midgate assembly of FIG. 4 installed in a vehicle.

FIG. 5 shows the midgate assembly 130 of FIG. 4 installed into the opening 119 in a vehicle body 112.

Figure 6:
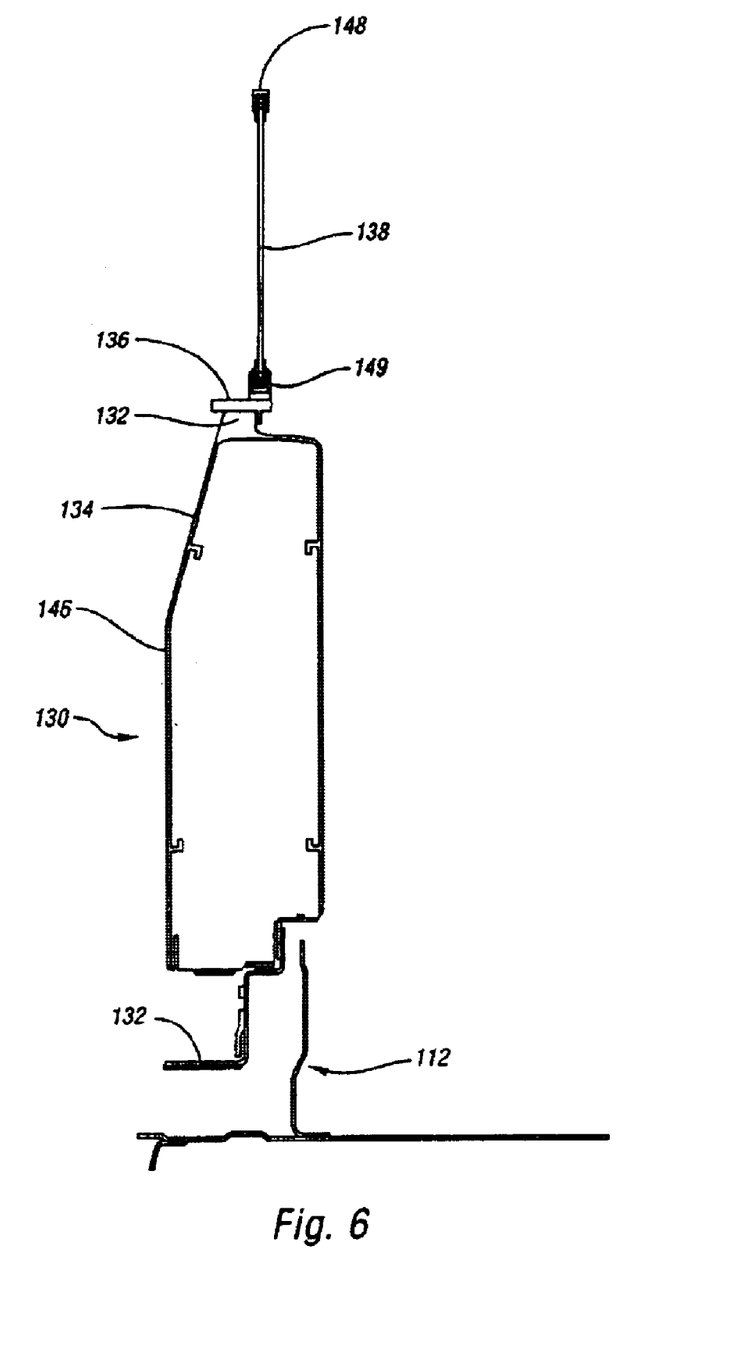
FIG. 6 shows a cross sectional view of the assembly of FIG. 5.

FIG. 6 shows a vertical cross sectional view of the midgate assembly 130 in the vehicle body 112 of FIG. 5. As shown, the window 138 is adhered along an upper edge by a fixed upper support channel 148 and is similarly supported along its lower edge as shown in FIG. 6 by the support channel 149.

The midgate assemblies 30, 50, 130 described above may include any of a variety of different midgate features, which will be described below with reference to FIGS. 7a–15.

Figure 7A:
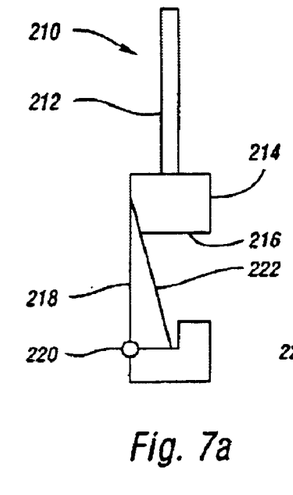
FIGS. 7a and b show schematic vertical cross sectional views of a midgate assembly having a ramp member positioned in closed and open positions with respect to a pass-through aperture in a midgate panel.
Figure 7B:
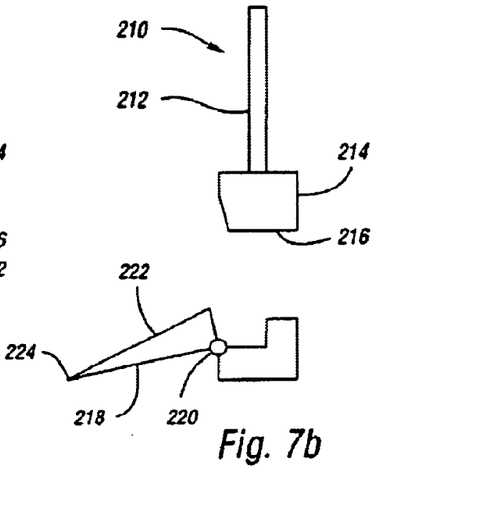

FIGS. 7a–10 illustrate the use of ramp members implemented into a midgate panel. Midgate panels may be provided with pass-through openings to facilitate storage of long cargo items, such as long boards, or the like. Long cargo items are typically slid in from the rear of a pickup truck bed by a person standing near the rear of the pickup truck, and it may be difficult to insert the ends of these long cargo items through the pass-through opening in the midgate panel without crawling onto the pickup truck bed. Accordingly, ramp members are provided which double as closure panels and assist in directing the longer cargo items through the pass-through aperture when the longer cargo items are slid in from the rear end of a pickup truck bed. FIGS. 7a and 7b show schematic vertical cross sectional views of a midgate assembly 210 including a window 212 and midgate panel 214. The midgate panel 214 includes a pass-through aperture 216 which is selectively covered by the ramp member 218. The ramp member 218 is pivotally connected to the midgate panel 214 at the hinge 220, and includes a distal end 224 which contacts a body floor and a ramp surface 222 which guides cargo through the pass-through aperture 216.

Figure 8A:
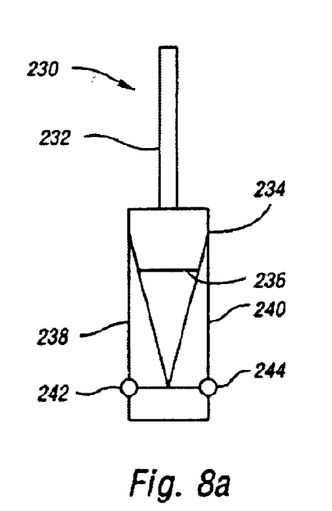
FIGS. 8a and b show schematic vertical cross sectional views of a midgate assembly having first and second ramp members in closed and open positions, respectively, with respect to a pass-through aperture in a midgate panel.
Figure 8B:
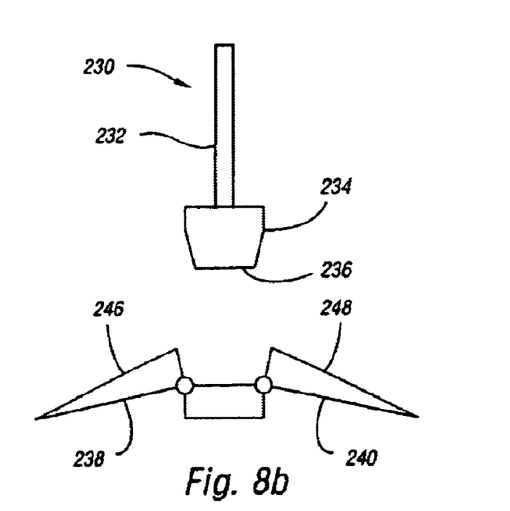

FIGS. 8a and 8b show schematic vertical cross sectional views of a midgate assembly 230 which includes a window 232, midgate panel 234, pass-through aperture 236, and two ramp members 238, 240 which are pivotally connected to the midgate panel 234 at the hinges 242, 244, respectively, to selectively cover the pass-through aperture 236. The ramp members 238, 240 include ramp surfaces 246, 248 to guide longer cargo items through the pass-through aperture 236.

Figure 9:
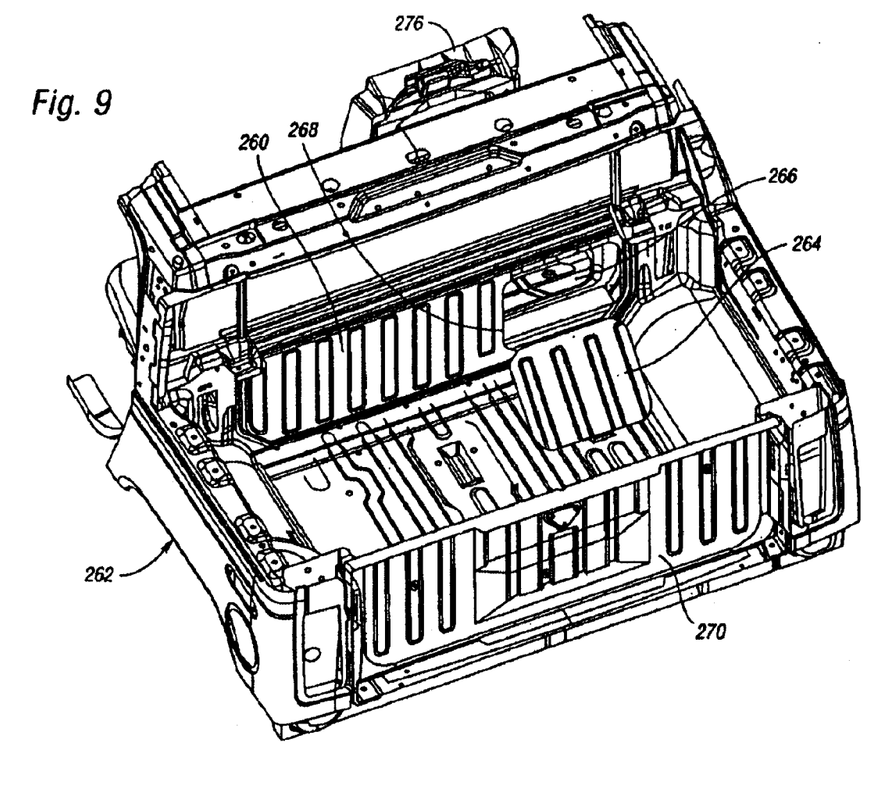
FIG. 9 shows a rear perspective view of a vehicle body having a midgate panel with a pass-through aperture and a ramp member in an open position.
Figure 10:
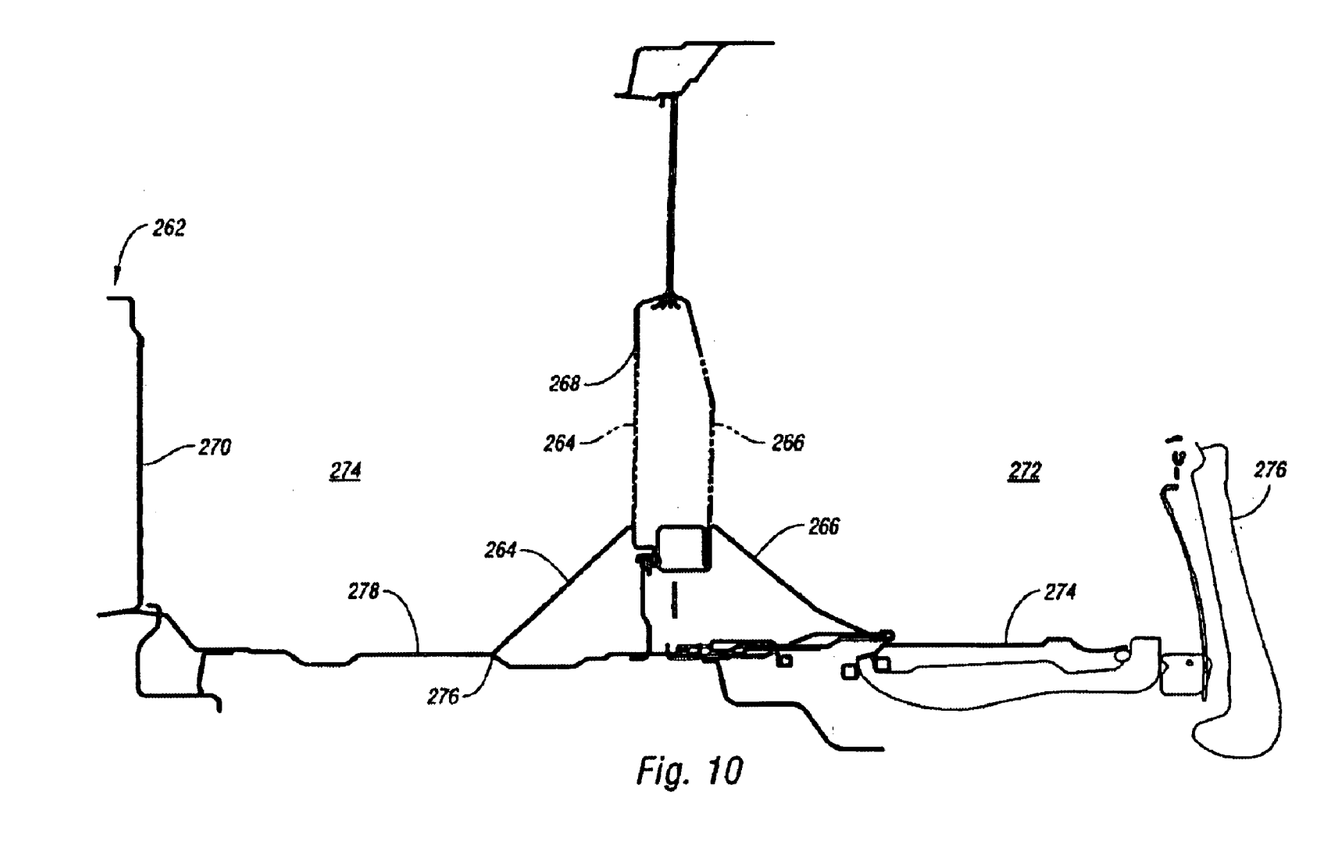
FIG. 10 shows a longitudinal cross sectional view of the body assembly of FIG. 9 with the ramp members in the open position, with the closed position in phantom.

FIGS. 9 and 10 show a particular embodiment of a midgate panel 260 on a vehicle body 262 which incorporates ramp members 264, 266 for selectively covering a pass-through aperture 268 in the midgate panel 260. The ramp members 264, 266 are pivotable between the closed position shown in phantom in FIG. 10 to cover the pass-through opening and the open position shown in solid lines in FIG. 10 to expose the pass-through aperture 268 and allow use of the ramp members 264, 266 to guide cargo through the pass-through aperture 268 when the cargo is slid from the rear end 270 of the body 262 onto the ramp member 264, or from the passenger compartment 272 across the ramp member 266 through the aperture 268. The ramp members 264, 266 are preferably a composite or metal material. FIGS. 9 and 10 also show the collapsed seat members 274, 276 which increase storage capacity in the passenger compartment 272 to allow the longer cargo items to extend from the rear cargo area 274 into the passenger compartment 272.

As shown in FIG. 10, the distal end 276 of the ramp member 264 contacts the body floor 278 when in the open position. The ramp members described above may be implemented into any of the midgate panels 34, 134 described previously.

Figure 11A:
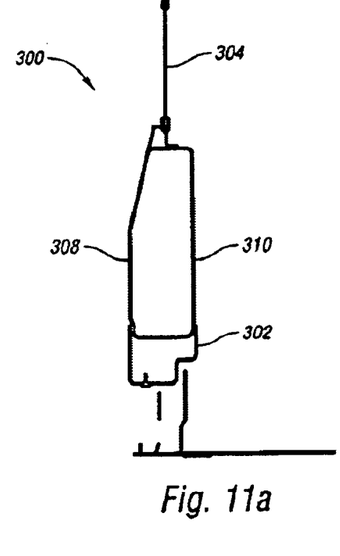
FIG. 11a shows a vertical cross sectional view of a midgate panel having a pass-through opening covered by first and second slideable closures.
Figure 11B:
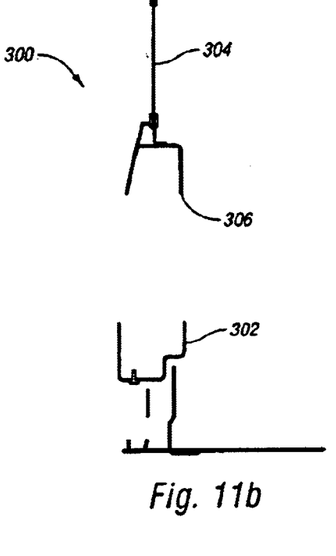
FIG. 11b shows a vertical cross sectional view of the midgate panel of FIG. 11a with the slideable closures slid to an open position, and therefore not shown in the cross section.
Figure 12:
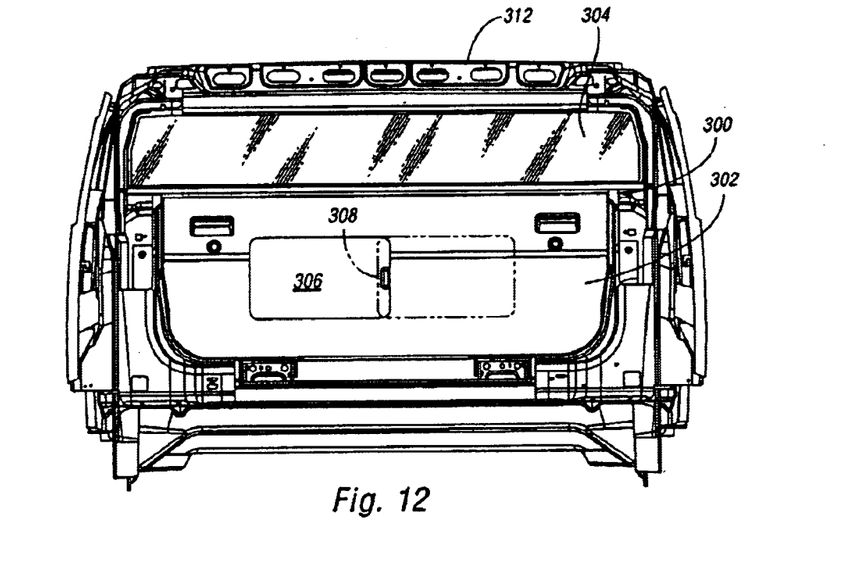
FIG. 12 shows a rear view of the midgate panel and slideable pass-through closure of FIG. 11a with the slideable closure in the open position.

FIGS. 11a, 11b and 12 show a midgate assembly 300 having a midgate panel 302 positioned below a window 304 and including a pass-through aperture 306 which is selectively exposed by slideable pass-through closures 308, 310 which are slideably connected to the midgate panel 302 for movement between the closed position shown in FIG. 11a and the open position shown in FIGS. 11b and 12. FIG. 12 also shows the body 312 which forms the opening within which the midgate assembly 300 is installed.

Figure 13A:
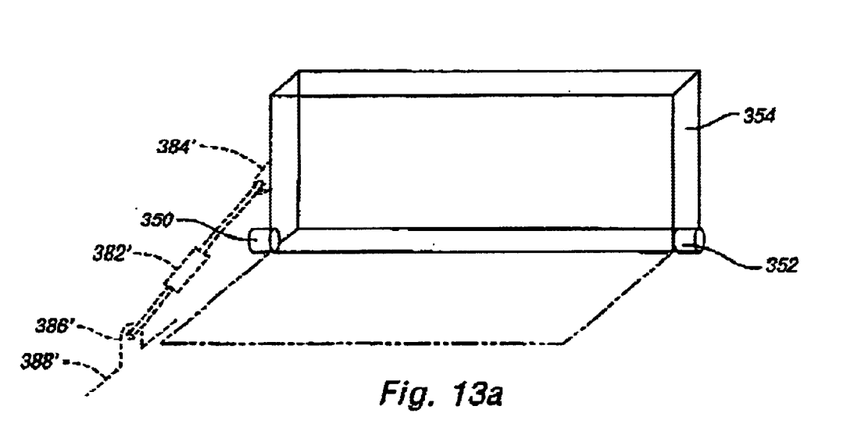
FIG. 13a shows a schematic perspective view of a midgate panel including a drive motor for pivoting the panel.
Figure 13B:
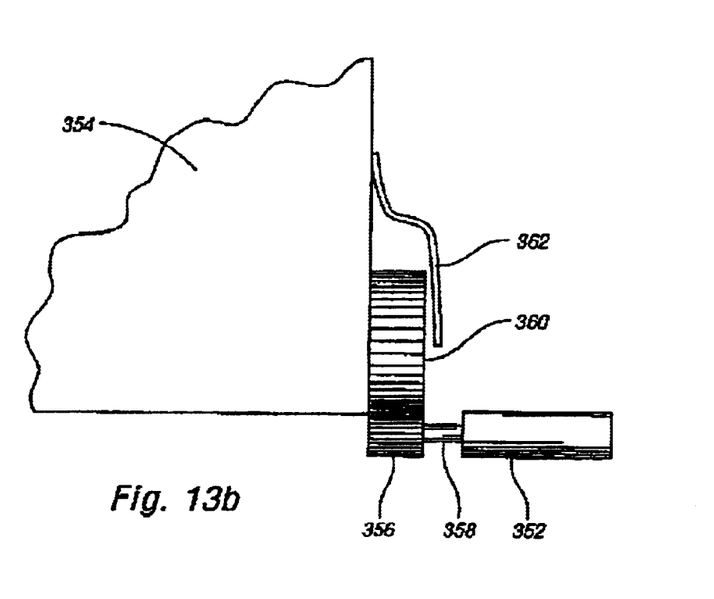

FIGS. 13a and 13b schematically illustrate the use of drive motors 350, 352 which are operative to pivot the midgate panel 354 between open and closed positions. As shown, the motor 352 rotates a drive gear 356 through a shaft 358, and the rotation of the drive gear 356 actuates pivotal movement of the midgate panel 354 by engagement of the teeth of the drive gear 356 with the teeth of the driven gear 360. A trim piece 362 is provided to cover the driven gear 360. Of course, this configuration may be replaced with a curved rack and pinion, a cable/pulley drive system, a drive motor in the middle of the midgate panel, etc. The system may be equipped with a clutch. Further, a single motor may be used as a regulator, latching motor, and midgate drive motor, etc. Remote keyless entry may be implemented to signal pivotal movement of the midgate panel. These drive motors may be implemented with any of the previously described midgate panels. A counter balance gas strut 382', the operation of which is the same as counter balance strut 382 described below with respect to FIGS. 14a–d, may be used in combination with the drive motor 352 (with or without drive motor 350) as will be readily understood by those skilled in the art. A support bracket 384', a floor bracket 386' and a body floor 388' are configured the sane as the correspondingly numbered components in FIGS. 14a–d.

Figure 14A:
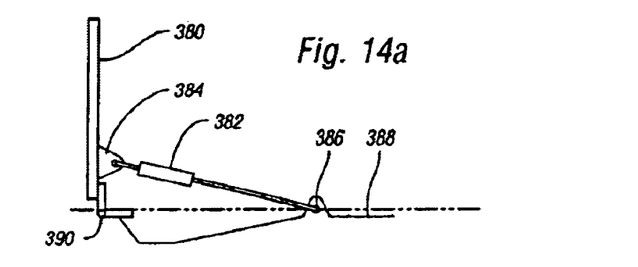
FIGS. 14a–d show sequential side schematic illustrations of a midgate panel and counterbalance strut in various positions between upright (14a) and collapsed (14d) positions.
Figure 14B:
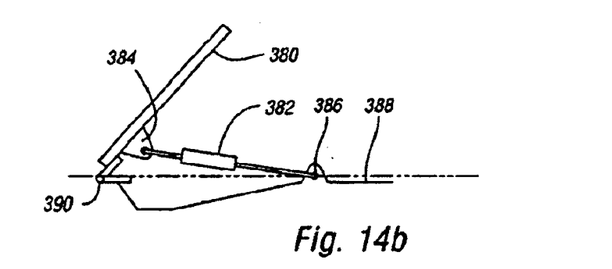
Figure 14C:
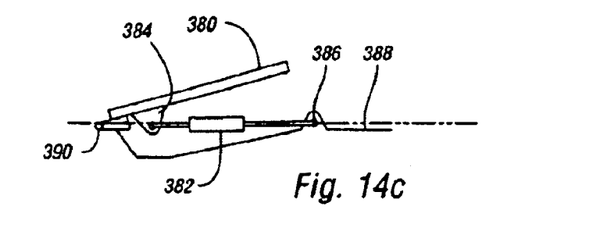
Figure 14D:
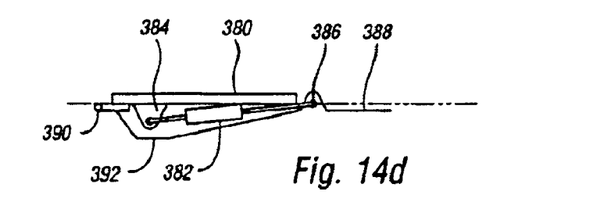

FIGS. 14a–d show sequential positions of a midgate panel 380 pivoting between an upright position shown in FIG. 14a and a collapsed position in FIG. 14d. As illustrated, the counterbalance gas strut 382 is operatively connected between a support bracket 384 on the midgate panel 380 and a floor bracket 386 extending from the body floor 388. As shown, the midgate panel 380 is pivotally connected to the body floor 388 at a pivot joint 390.

In the upright position shown in FIG. 14a, the gas strut 382 is exerting a force on the midgate panel 380 and the bracket 386. The gas strut 382 is always attempting to expand, and therefore holds the midgate panel 380 in the upright position. In FIG. 14b, a user is exerting a force against the midgate panel 380 to pivot the midgate in a closing direction about the pivot joint 390. The gas strut 382 is still exerting a force on the midgate panel and floor bracket 386. The force the user is exerting on the midgate panel is overcoming the gas strut, causing it to compress. The gas strut is moving closer to the floor as the midgate panel 380 is closing. At the point shown in FIG. 14c, the gas strut 382 is parallel to the floor 388 and begins to go over center. The gas strut 382 does not compress any more than this position. When the midgate panel is pushed down even further, the gas strut 382 begins to expand and causes the midgate panel to be pulled downward toward the floor 388. In the FIG. 14d, the gas strut 382 has pulled the midgate panel 380 into the folded down position. The user force was not needed to pull the midgate panel down to its final position. The gas strut 382 serves as a damping device to prevent the midgate panel 380 from popping up when the vehicle goes over bumps and swells. As shown, the recess 392 in the body floor 388 allows the gas strut 382 and bracket 384 to extend below the plane of the body floor 388 for compact storage. The gas strut 382 may be replaced by a compression spring or the like. The gas strut includes a pressurized cylinder which acts to extend a piston. The performance criteria of the gas strut would depend upon the mass of the midgate panel, and must proved a sufficient assist force for closing and a sufficient holding force to prevent bouncing of the midgate in the open position. The gas strut 382 may be used with any of the previously described midgate panels.

Figure 15:
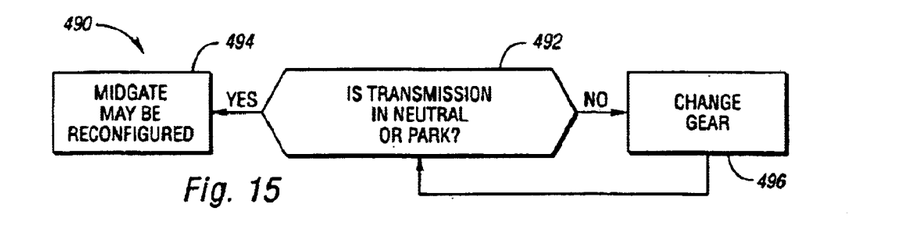
FIG. 15 shows a schematic illustration of a block-out control for controlling movement of a midgate based upon the condition of a corresponding transmission.

FIG. 15 schematically illustrates a block out control 490 which prevents opening of the midgate unless a corresponding vehicle transmission is in neutral or park. At the decision block 492, a decision is made whether the transmission is in neutral or park. If the transmission is in neutral or park, the window or midgate may be adjusted electrically or mechanically (block 494). If the transmission is not in neutral or park, then the window and/or midgate panel would be disabled until the transmission gearing is changed to neutral or park (block 496). An electrical circuit would provide an appropriate input to a body control module to enable unlatching only when the vehicle is in park or neutral.

Supporting disclosure relating to the blockout or interlock controls and other features may also be found in commonly owned U.S. Pat. Nos. 5,934,727; 6,260,916; 6,416,104; 6,478,355 and 6,513,863, which are hereby incorporated by reference in their entirety.

Any or all of the features of the invention described above with reference to FIGS. 7a–15 may be combined with the midgate assemblies 30, 50, 130 of FIGS. 2–6. While the best modes for carrying out the invention have been described in detail, those familiar with the art to which this invention relates will recognize various alternative designs and embodiments for practicing the invention within the scope of the appended claims.

What is claimed is:

1. A vehicle body having a first compartment for carrying passengers or cargo and a second compartment for carrying cargo rearwardly adjacent the first compartment, the body comprising:

a frame defining an opening between the first and second compartments;

a window fixed in an upper portion of the opening;

a crossbar fixed in the opening below the window;

a midgate panel pivotally connected in a lower portion of the opening for movement between a closed position covering the lower portion of the opening and an open position permitting access through the lower portion of the opening;

a drive motor operatively connected with the midgate panel for pivoting the midgate panel between said open and closed positions; and a pass-through aperture formed in the midgate panel and a ramp member pivotally movable between a closed position covering the pass-through aperture and an open position contacting a body floor and forming a ramp to facilitate sliding long cargo through the pass-through aperture.

2. The body of claim 1, wherein said ramp member has a hinge end pivotally connected to the midgate panel and an opposite end which contacts the body floor in said open position.

3. The body of claim 1, further comprising a second ramp member connected to an opposite side of the midgate panel for selectively covering an opposite end of the pass-through aperture.

4. A vehicle body having a first compartment for carrying passengers or cargo and a second compartment for carrying cargo rearwardly adjacent the first compartment, the body comprising:
   a frame defining an opening between the first and second components;
   a window fixed in an upper portion of the opening;
   a crossbar fixed in the opening below the window;
   a midgate panel pivotally connected in a lower portion of the opening for movement between a closed position covering the lower portion of the opening and an open position permitting access through the lower portion of the opening;
   a drive motor operatively connected with the midgate panel for pivoting the midgate panel between said open and closed positions; and
   a counterbalancing strut operatively connected between the midgate panel and a body floor to bias the midgate panel toward open and closed positions, alternatively, depending upon the pivoted position of the midgate panel.

5. A vehicle body having a first compartment for carrying passengers or cargo and a second compartment for carrying cargo rearwardly adjacent the first compartment, the body comprising:
   a frame defining an opening between the first and second compartments;
   a window fixed in an upper portion of the opening;
   a crossbar fixed in the opening below the window;
   a midgate panel pivotally connected in a lower portion of the opening for movement between a closed position covering the lower portion of the opening and an open position permitting access through the lower portion of the opening;
   a drive motor operatively connected with the midgate panel for pivoting the midgate panel between said open and closed positions; and
   a handle for selectively allowing the movement of the midgate panel between such positions, and a control for allowing such movement only when a corresponding vehicle transmission is in a park or neutral position.

6. A vehicle body having a first compartment for carrying passengers or cargo and a second compartment for carrying cargo rearwardly adjacent the first compartment, the body comprising:
   a frame defining an opening between the first and second compartments;
   a window fixed in an upper portion of the opening;
   a crossbar fixed in the opening below the window;
   a midgate panel pivotally connected in a lower portion of the opening for movement between a closed position covering the lower portion of the opening and an open position permitting access through the lower portion of the opening; and
   a counterbalancing strut operatively connected between the midgate panel and a body floor to bias the midgate panel toward open and closed positions, alternatively, depending upon the pivoted position of the midgate panel.

7. The body of claim 6, wherein said counterbalancing strut comprises a gas strut which is pivotable between a first position biasing the midgate panel toward the closed position and a second position biasing the midgate panel toward the open position, with a center position therebetween at which the gas strut is at its most compressed position.

8. The body of claim 7, wherein the body floor includes a floor recess, and said gas strut is at least partially positioned within the floor recess when in said second position.

9. The body of claim 6, further comprising a pass-through aperture formed in the midgate panel and a ramp member pivotally movable between a closed position covering the pass-through aperture and an open position contacting a body floor and forming a ramp to facilitate sliding long cargo through the pass-through aperture.

10. The body of claim 9, wherein said ramp member has a hinge end pivotally connected to the midgate panel and an opposite end which contacts the body floor in said open position.

11. The body of claim 9, further comprising a second ramp member connected to an opposite side of the midgate panel for selectively covering an opposite end of the pass-through aperture.

12. The body of claim 6, further comprising a slideable pass-through closure slideably positioned over a pass-through opening formed in the midgate panel.

13. The vehicle body of claim 6, further comprising a handle for selectively allowing the movement of the midgate panel between such positions, and a control for allowing such movement only when a corresponding vehicle transmission is in a park or neutral position.

14. A midgate assembly for use in an opening between adjacent compartments of a vehicle, the midgate assembly comprising:
   a window affixable in an upper portion of the opening;
   a crossbar affixable in the opening below the window;
   a midgate panel pivotally connectable in a lower portion of the opening for movement between a closed position covering the lower portion of the opening and an open position permitting access through the lower portion of the opening;
   a counterbalancing strut operatively connectable between the midgate panel and a body floor to bias the midgate panel toward open and closed positions, alternatively, depending upon the pivoted position of the midgate panel; and
   wherein said counterbalancing strut comprises a gas strut which is pivotable between a first position biasing the midgate panel toward the closed position and a second position biasing the midgate panel toward the open position, with an overcenter position therebetween at which the gas strut is at its most compressed position, and said gas strut is at least partially positionable within a floor recess when in said second position.

15. The midgate assembly of claim 14, further comprising a pass-through aperture formed in the midgate panel and a ramp member pivotally movable between a closed position covering the pass-through aperture and an open position contacting a body floor and forming a ramp to facilitate sliding long cargo through the pass-through aperture, wherein said ramp member has a hinge end pivotally connected to the midgate panel and an opposite end which is engageable with the body floor in said open position.

16. The midgate assembly of claim 15, further comprising a second ramp member connected to an opposite side of the midgate panel for selectively covering an opposite end of the pass-through aperture.

17. The midgate assembly of claim 14, further comprising a slideable pass-through closure slideably positioned over a pass-through opening formed in the midgate panel.

18. The midgate assembly of claim 14, further comprising a handle for selectively allowing the movement of the midgate panel between such positions, and a control for allowing such movement only when a corresponding vehicle transmission is in a park or neutral position.

19. The midgate assembly of claim 14, wherein said window includes a sliding glass mini-window to facilitate access through the window.

* * * * *